US008648500B1

(12) United States Patent
Jenkins et al.

(10) Patent No.: US 8,648,500 B1

(45) Date of Patent: Feb. 11, 2014

(54) POWER SUPPLY REGULATION AND OPTIMIZATION BY MULTIPLE CIRCUITS SHARING A SINGLE SUPPLY

(75) Inventors: Michael O. Jenkins, San Jose, CA (US); John R. Carrel, Rockwall, TX (US); Mark J. Marlett, Livermore, CA (US)

(73) Assignee: XILINX, Inc., San Jose, CA (US)

( * ) Notice: Subject to any disclaimer, the term of this patent is extended or adjusted under 35 U.S.C. 154(b) by 329 days.

(21) Appl. No.: 13/110,407

(22) Filed: May 18, 2011

(51) Int. Cl.
*H02B 1/24* (2006.01)

(52) U.S. Cl.
USPC .............................. 307/112; 307/82; 713/300

(58) Field of Classification Search
USPC .......... 363/16–17, 41, 46, 56; 307/24, 31, 64, 307/66, 80, 82, 112; 323/212, 213, 222, 323/237, 243, 246; 713/300, 320, 340
See application file for complete search history.

(56) References Cited

U.S. PATENT DOCUMENTS

| | | | | |
|---|---|---|---|---|
| 4,800,298 | A * | 1/1989 | Yu et al. | 326/27 |
| 5,943,227 | A * | 8/1999 | Bryson et al. | 363/95 |
| 6,563,294 | B2 * | 5/2003 | Duffy et al. | 323/283 |
| 7,007,176 | B2 * | 2/2006 | Goodfellow et al. | 713/300 |
| 8,004,111 | B2 * | 8/2011 | Potter et al. | 307/20 |
| 8,050,129 | B2 * | 11/2011 | Liu et al. | 365/225.7 |
| 2006/0152087 | A1 * | 7/2006 | De Oliverira Kastrup Pereira et al. | 307/112 |
| 2009/0174262 | A1 * | 7/2009 | Martin et al. | 307/82 |

* cited by examiner

*Primary Examiner* — Rajnikant Patel
(74) *Attorney, Agent, or Firm* — Gerald Chan; Lois D. Cartier

(57) ABSTRACT

In accordance with some embodiments, an integrated circuit device comprises a circuit configured to provide a sense signal representing a dynamic power requirement of the circuit to a first sense node, a first sense switch coupled between the first sense node and a first die bump, and a sense switch controller configured to provide a control signal to the first sense switch.

14 Claims, 7 Drawing Sheets

POWER SUPPLY REGULATION AND OPTIMIZATION BY MULTIPLE CIRCUITS SHARING A SINGLE SUPPLY

TECHNICAL FIELD

Embodiments described herein relate to integrated circuit devices (ICs), and in particular, to a method of and circuit for power supply regulation in an integrated circuit device.

BACKGROUND

Semiconductor technology continues to scale to ever smaller transistor sizes to include more and more transistors in a single integrated circuit device. This geometric scaling down of transistor dimensions results in increasingly higher electric fields in the transistors. One consequence of these higher electric fields is higher supply currents yielding higher dissipated power. One way to counter this increase in supply currents is to use lower power supply voltages to keep the dissipated power within reasonable limits. With lower power supply voltages, voltage drops in the on-package and on-chip portion of a power distribution network (PDN) are becoming dominant and are a significant detractor to performance. The lower supply voltages and higher supply currents transiting through the package, together with chip resistive losses, result in ever-increasing variations of supply voltages received at the different circuit blocks within a device. These variations limit the performance that can be guaranteed by design, because an externally supplied voltage level may be sufficient for one circuit block, while the same externally supplied voltage level may be inadequate for what another circuit block requires.

SUMMARY

In accordance with some embodiments, an integrated circuit device includes a circuit configured to provide a sense signal representing a dynamic power requirement of the circuit to a first sense node, a first sense switch coupled between the first sense node and a first die bump, and a sense switch controller configured to provide a control signal to the first sense switch.

In any of the embodiments described herein, the first sense switch can comprise a first resistor coupled in parallel to a PFET, and the sense switch controller can be configured to provide the control signal to a gate terminal of the PFET.

In any of the embodiments described herein, the control signal can be an analog voltage signal, and the sense switch controller can be configured to control an on-resistance of the PFET with the analog voltage signal.

In any of the embodiments described herein, the integrated circuit device can further comprise a second sense switch coupled between a second sense node and a second die bump, wherein the second sense switch comprises a second resistor coupled in parallel to a NFET, and the sense switch controller is configured to provide the control signal to a gate terminal of the NFET through an inverter.

In any of the embodiments described herein, the first sense node can be configured to sense a positive supply potential of the circuit, the second sense node can be configured to sense a negative supply potential of the circuit, and the sense signal can be a voltage difference between a locally received positive supply voltage level and a locally received negative supply voltage level of the circuit.

In any of the embodiments described herein, the sense signal can be a voltage reference provided by a dependent voltage source between the first sense node and the second sense node.

In any of the embodiments described herein, the voltage reference can be dependent on either a difference between a frequency of a ring oscillator and a target frequency of the circuit, or a lock status of a PLL of the circuit.

In any of the embodiments described herein, the integrated circuit device can further comprise a second sense switch coupled between a second sense node and a second die bump, wherein the second sense switch comprises a second resistor coupled in parallel to a NFET, and the sense switch controller can be configured to provide an inverse control signal to a gate terminal of the NFET, the inverse control signal being an analog voltage signal, and the sense switch controller can be configured to control an on-resistance of the NFET with the analog voltage signal.

In any of the embodiments described herein, the integrated circuit device can further comprise a second sense switch coupled between a second sense node and a second die bump, wherein the second sense switch comprises a second resistor coupled in parallel to a plurality of NFETs arranged in parallel, the control signal can be a signal bus comprising a plurality of control bits, and the sense switch controller can be configured to, for each of the plurality of NFETs, provide one of the plurality of control bits of the signal bus to a gate terminal of the corresponding NFET through a corresponding inverter.

In any of the embodiments described herein, the first sense switch can comprise a first resistor coupled in parallel to a plurality of PFETs arranged in parallel, the control signal can be a signal bus comprising a plurality of control bits, and the sense switch controller can be configured to, for each of the plurality of PFETs, provide one of the plurality of control bits of the signal bus to a gate terminal of the corresponding PFET.

In accordance with other embodiments, an integrated circuit device includes a first die bump, a plurality of circuits coupled to the first die bump, wherein each one of the circuits comprises a first sense switch coupled between a first sense node and the first die bump, and a sub-circuit configured to provide a sense signal representing a dynamic power requirement of the sub-circuit to the first sense node. The integrated circuit device further includes a sense switch controller configured to provide a plurality of control signals to the respective first sense switches.

In any of the embodiments described herein, each one of the first sense switches can comprise a first resistor coupled in parallel to a PFET, wherein the sense switch controller is configured to provide a corresponding one of the control signals to a corresponding gate terminal of the corresponding PFET.

In any of the embodiments described herein, the integrated circuit device can further comprise a second die bump, wherein each one of the circuits further comprises a second sense switch coupled between a second sense node and the second die bump, the second sense switch comprising a second resistor coupled in parallel to a NFET, and wherein the sense switch controller is configured to provide a corresponding one of the control signals to a corresponding gate terminal of the corresponding NFET through a corresponding inverter.

In any of the embodiments described herein, each one of the circuits can further comprise one of the first sense nodes sensing a positive supply potential of the corresponding circuit, and one of the second sense nodes sensing a negative supply potential of the corresponding circuit, wherein each one of the sense signals is a voltage difference between a locally received positive supply voltage level of one of the sub-circuits and a locally received negative supply voltage level of the corresponding sub-circuit.

In any of the embodiments described herein, the sense switch controller can be configured to assert one of the control signals to close one of the first sense switches and one of the second sense switches corresponding to one of the plurality of sub-circuits having the lowest voltage difference between the locally received positive supply voltage level of one of the sub-circuits and the locally received negative supply voltage level of the corresponding sub-circuit.

In any of the embodiments described herein, the sense switch controller can be configured to assert one of the control signals to close one of the first sense switches corresponding to one of the plurality of sub-circuits having the highest dynamic power requirement.

In accordance with other embodiments, a method of providing a feedback voltage to an external power supply of an integrated circuit device having a plurality of circuits includes: providing a plurality of voltages, each one of the voltages representing a dynamic power requirement of one of the circuits of the integrated circuit device, and selecting one of the plurality of voltages corresponding to one of the circuits having the highest dynamic power requirement as the feedback voltage.

In any of the embodiments described herein, one or more of the plurality of voltages can represent a locally received supply voltage of a corresponding one or more of the circuits.

In any of the embodiments described herein, one or more of the plurality of voltages can be provided by a corresponding dependent voltage source.

In any of the embodiments described herein, one or more of the plurality of voltages can be dependent on either a difference between a frequency of a ring oscillator and a target frequency of the corresponding circuit, or a lock status of a PLL of the corresponding circuit.

Other and further aspects and features will be evident from reading the following detailed description of the embodiments.

BRIEF DESCRIPTION OF THE DRAWINGS

The drawings illustrate the design and utility of embodiments in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only example embodiments and are not therefore to be considered limiting of its scope.

FIG. 1-2 illustrates an example implementation of a sense switch in accordance with some embodiments.

FIG. 1-3 illustrates another example implementation of a sense switch in accordance with some embodiments.

FIG. 2-1 illustrates an integrated circuit device with a sense switch pair according to some embodiments.

FIG. 2-2 illustrates an example implementation of one sense switch of a sense switch pair in accordance with some embodiments.

FIG. 2-3 illustrates another example implementation of one sense switch of a sense switch pair in accordance with some embodiments.

FIG. 3 illustrates an integrated circuit device with a sense signal represented by a voltage across a dependent voltage source according to some embodiments.

FIG. 4-1 illustrates the connections between an external power source and an integrated circuit device in accordance with some embodiments.

FIG. 4-2 illustrates the connections between an external power source and an integrated circuit device in accordance with other embodiments.

FIG. 4-3 illustrates the connections between an external power source and an integrated circuit device in accordance with alternative embodiments.

DETAILED DESCRIPTION

Figure 1:
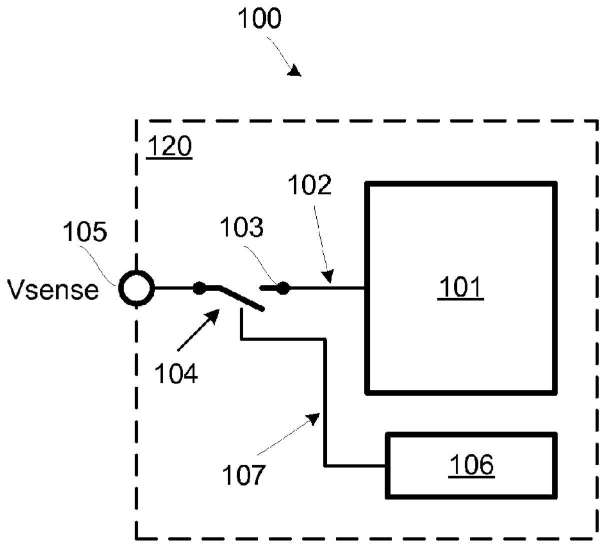
FIG. 1-1 illustrates an integrated circuit device with a sense switch according to some embodiments.

Various embodiments are described hereinafter with reference to the figures. It should be noted that the figures are not drawn to scale, and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Some known integrated circuit devices provide a sense output to regulate the voltage that is supplied from an external power source. Typically, regulation of an external power source is accomplished at the printed circuit board (PCB) level. An external power source may use the sense output as a feedback signal to monitor and adjust the voltage provided to the device. The sense output allows the external power source to increase or decrease the voltage to match the nominal operating voltage of the device depending on the actual voltage detected inside the device. However, this detected voltage is usually measured at only one of many different circuit blocks within the device. As a result, the integrated circuit device is still susceptible to variations of supply voltages received at the different circuit blocks within the device, because the sense output only accounts for one circuit block of the device. The devices and methods described herein overcome this limitation of the existing devices.

Figures 1, 2:
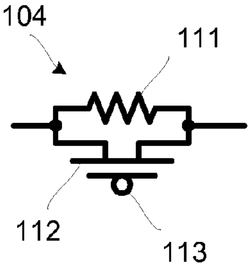
Figures 1, 2:
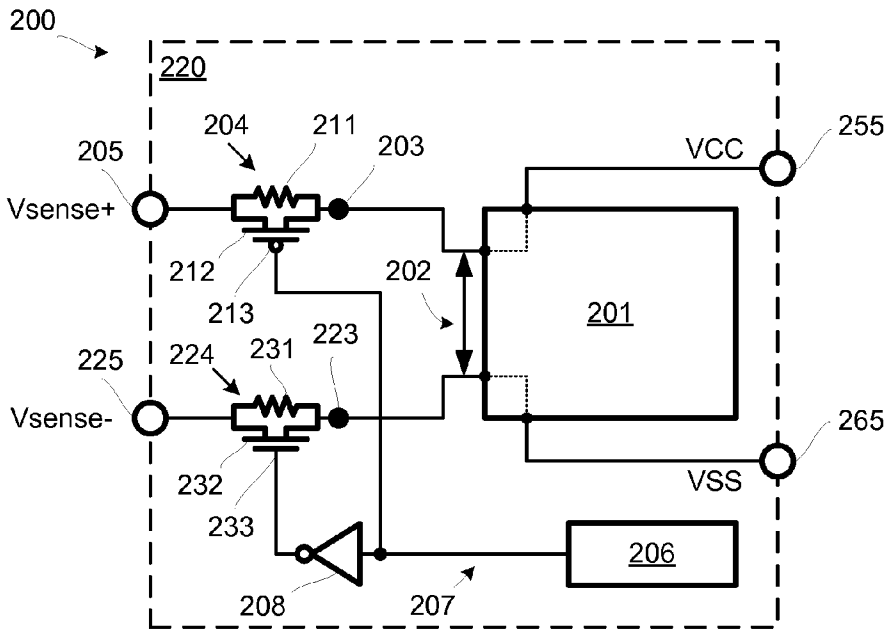

FIG. 1-1 illustrates an integrated circuit device 100 in accordance with some embodiments. The integrated circuit device 100 includes a semiconductor die 120 and a Vsense die bump 105. Additional die bumps may be present to connect other circuit I/Os to the device package (not shown). The integrated circuit device 100 further comprises a circuit 101, a Vsense sense node 103, a Vsense sense switch 104, and a sense switch controller 106 implemented on the semiconductor die 120. In addition, integrated circuit device 100 may also include other circuits that are not shown. The Vsense sense switch 104 is coupled between the Vsense sense node 103 and the Vsense die bump 105. The Vsense die bump 105 may be coupled to a Vsense output pad on the device package to provide a feedback signal to an external power source. In some embodiments, the Vsense sense switch 104 may comprise of a resistor 111 coupled in parallel with a PFET 112 as shown in FIG. 1-2. In other embodiments, the Vsense sense switch 104 may be implemented with other electrical switch circuits known in the art arranged in parallel with a resistive element.

The circuit 101 is configured to provide a sense signal 102 that represents a dynamic power requirement of the circuit 100 to the Vsense sense node 103. In some embodiments, the sense signal 102 may be a locally received supply voltage level at the circuit 101. The locally received supply voltage level at the circuit 101 may be lower than the voltage that is supplied to the integrated circuit device 100 from an external power source because of voltage drops across resistive paths on a printed circuit board (PCB) and along resistive paths between the package and the circuit 101. By providing a sense signal 102 that represents a dynamic power requirement of the circuit 101, an external power source may use the sense signal 102 as a feedback signal to increase or decrease the power supply voltage provided to the integrated circuit device 100 according to the actual voltage seen at the circuit 101.

The sense switch controller 106 is configured to provide a control signal 107 to the Vsense sense switch 104. In some embodiments, the control signal 107 is provided to the gate terminal 113 of the PFET 112. When the circuit 101 is enabled or powered on, the sense switch controller 106 asserts the control signal 107 to close the Vsense sense switch 104 to connect the sense signal 102 to the Vsense die bump 105. When circuit 101 is disabled or powered down for power savings, the sense switch controller 106 may deassert the control signal 107 to open the Vsense sense switch 104 to disconnect the sense signal 102 from the Vsense die bump 105. By coupling the sense signal 102 through Vsense sense switch 104, other circuits in the integrated device 100 may share the same Vsense die bump 105 and hence the same Vsense output pad to provide a feedback signal to an external power source. The Vsense sense switch 104 provides a way to disconnect the sense signal 102 from the Vsense die bump 105 to remove contributions to the feedback signal from circuit 101 when circuit 101 is disabled or powered down to more accurately reflect the overall dynamic power requirement of the integrated circuit device 100.

To prevent an external power source from driving the supply voltage provided to the maximum when all circuits in the integrated device 100 are powered down, resistor 111 of the Vsense sense switch 104 provides a quiescent voltage to Vsense die bump 105 such that the feedback signal to the external power source would have a nominal voltage level. In some embodiments, in order to reduce the parasitic effects of resistor 111, the resistance value of resistor 111 may be much greater than the on-resistance of the PFET 112. For example, in some embodiments, the resistance of resistor 111 to the on-resistance of the PFET 112 may have a ratio of at least 100:1. In alternative embodiments, other resistance values may be used.

In some embodiments, other circuits may be coupled to Vsense die bump 105. If the Vsense sense switch 104 is closed, the resulting reference voltage of the feedback signal on Vsense die bump 105 is then the weighted average of the contributions from each of the circuits including circuit 101. To adjust the contribution from circuit 101, the control signal 107 may be an analog voltage signal with a continuous range of voltages. By using an analog voltage signal, the on-resistance of the PFET 112 can be adjusted because the on-resistance of the PFET 112 is dependent on the gate voltage. This allows the sense switch controller 106 to adjust the contribution to the feedback signal from circuit 101 by adjusting the on-resistance of the PFET 112. For example, by lowering the on-resistance of PFET 112, more weight is given to the contribution from circuit 101 to the feedback signal because the voltage at Vsense die bump 105 side of the Vsense sense switch 104 increases due to the decrease in the equivalent resistance of Vsense sense switch 104. By increasing the on-resistance of PFET 112, less weight is given to the contribution from circuit 101 to the feedback signal because the voltage at Vsense die bump 105 side of the Vsense sense switch 104 decreases due to the increase in the equivalent resistance of Vsense sense switch 104.

Figures 1, 2, 3:
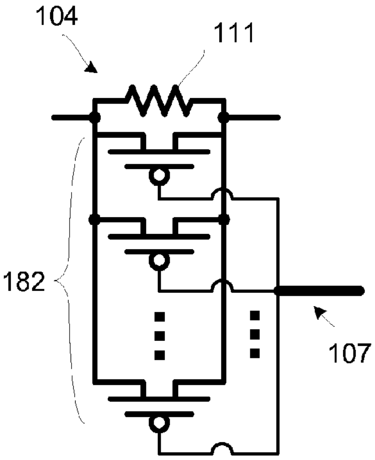
Figure 2:
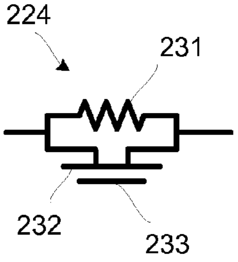
Figures 2, 3:
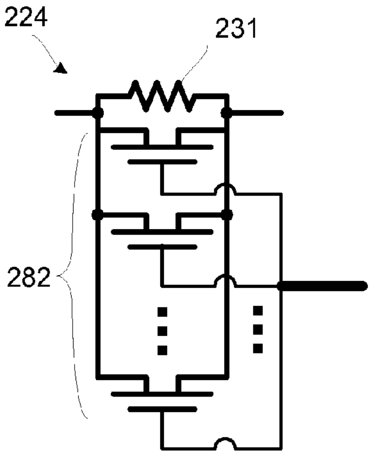
Figure 3:
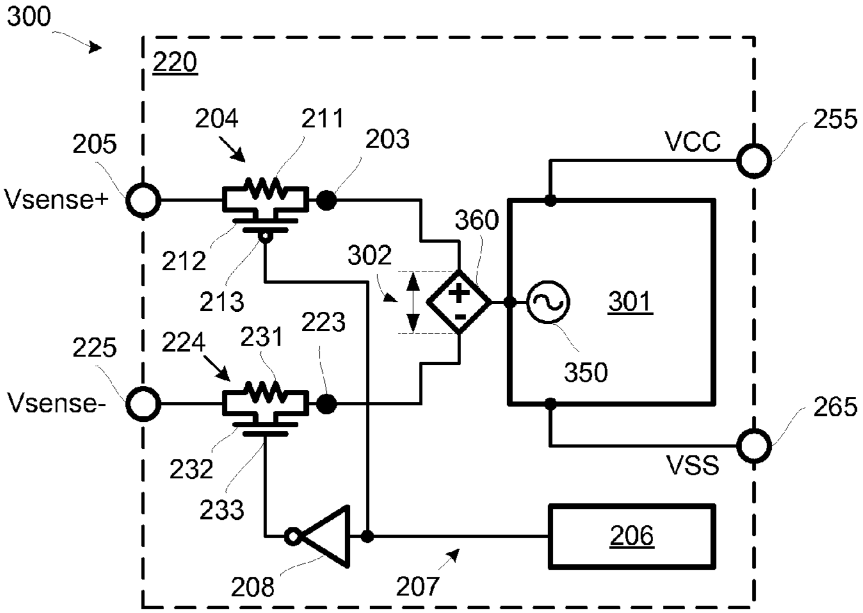

In other embodiments, the Vsense sense switch 104 may comprise a resistor 111 coupled in parallel with a plurality of PFETs 182 arranged in parallel as shown in FIG. 1-3. In these embodiments, to adjust the contribution to the feedback signal from circuit 101, the control signal 107 may be a digital signal bus that has a plurality of control bits with each control bit controlling one of the PFETs 182. By using a plurality of PFETs 182 arranged in parallel, the sense switch controller 106 can adjust the equivalent resistance of the Vsense sense switch 104. For example, if there are n number of PFETs in parallel, then the equivalent resistance of the Vsense sense switch 104 can take on a range of $2^n$ values depending on how many of the control bits of the control signal 107 are asserted and the individual on-resistances of each of the PFETs 182. Adjusting the equivalent on-resistance of the Vsense sense switch 104 allows the sense switch controller 106 to give greater or lesser weight to the contribution to the feedback signal from circuit 101 by adjusting the voltage at Vsense die bump 105 side of the Vsense sense switch 104.

FIG. 2-1 illustrates an integrated circuit device 200 in accordance with some other embodiments. The integrated circuit device 200 includes a semiconductor die 220 and Vsense+ die bump 205 and Vsense− die bump 225. The integrated circuit device 200 also includes a positive supply potential VCC die bump 255 and a negative supply potential VSS die bump 265. Additional VCC and VSS die bumps and other die bumps may be present to connect other circuit I/Os to the device package (not shown). The integrated circuit device 200 further comprises a circuit 201, Vsense+ sense node 203, Vsense− sense node 223, Vsense+ sense switch 204, Vsense− sense switch 224, and a sense switch controller 206 implemented on the semiconductor die 220. In addition, integrated circuit device 200 may also include other circuits that are not shown.

The Vsense+ sense switch 204 is coupled between the Vsense+ sense node 203 and the Vsense+ die bump 205. The Vsense+ die bump 205 may be coupled to a Vsense+ output pad on the device package to provide a positive voltage reference to an external power source. In some embodiments, the Vsense+ sense switch 204 may comprise of a resistor 211 coupled in parallel with a PFET 212. In other embodiments, the Vsense+ sense switch 204 may be implemented with other electrical switch circuits known in the art arranged in parallel with a resistive element.

The Vsense− sense switch 224 is coupled between the Vsense− sense node 223 and the Vsense− die bump 225. The Vsense− die bump 225 may be coupled to a Vsense− output pad on the device package to provide a negative voltage reference to an external power source. In some embodiments, the Vsense− sense switch 224 may comprise of a resistor 231 coupled in parallel with a NFET 232 as shown in FIG. 2-2. In other embodiments, the Vsense− sense switch 224 may be implemented with other electrical switch circuits known in the art arranged in parallel with a resistive element.

The circuit 201 is configured to provide a sense signal 202 that represents a dynamic power requirement of the circuit 201. In some embodiments, the sense signal 202 may be a voltage difference between a locally received positive supply voltage level at the circuit 201 and a locally received negative supply voltage level at the circuit 201. Vsense+ sense node 203 may be coupled to the positive supply potential of the circuit 201, and Vsense− sense node 223 may be coupled to the negative supply potential of the circuit 201. The locally received positive supply voltage level may be lower than the voltage that is supplied to the integrated circuit device 200 from an external power source because of voltage drops across resistive paths on a printed circuit board (PCB) and along resistive paths between the package and the circuit 201. Similarly, the locally received negative supply voltage level may be higher than the voltage that is supplied from an external power source. By providing a voltage reference representing the supply voltage levels received at the circuit 201 on the sense signal 202, an external power source may use this as a feedback signal to increase or decrease the power supply voltage provided to the integrated circuit device 200 according to the actual voltage levels seen at the circuit 201.

The sense switch controller 206 is configured to provide a control signal 207 to the Vsense+ sense switch 204 and the Vsense− sense switch 224. In some embodiments, the control signal 207 is provided to the gate terminal 213 of the PFET 212, and the control signal 207 is provided to the gate terminal 233 of the NFET 232 through an inverter 208. When the circuit 201 is enabled or powered on, the sense switch controller 206 asserts the control signal 207 to close the Vsense+ sense switch 204 and the Vsense− sense switch 224 to connect the sense signal 202 to the Vsense+ die bump 205 and Vsense− die bump 225, respectively. When circuit 201 is disabled or powered down for power savings, the sense switch controller 206 may deassert the control signal 207 to open the Vsense+ sense switch 204 and the Vsense− sense switch 224 to disconnect the sense signal 202 from the Vsense+ die bump 205 and Vsense− die bump 225. By coupling the sense signal 202 through Vsense+ sense switch 204 and Vsense− sense switch 224, other circuits in the integrated device 200 may share the same Vsense+ die bump 205 and Vsense− die bump 225, and hence the same feedback signal to provide a voltage reference to an external power source. The Vsense+ sense switch 204 and the Vsense− sense switch 224 provide a way to disconnect the sense signal 202 from Vsense+ die bump 205 and Vsense− die bump 225 to remove contributions to the feedback signal from circuit 201 when the circuit 201 is disabled or powered down to more accurately reflect the overall dynamic power requirement of the integrated circuit device 200.

To prevent an external power source from driving the supply voltages provided to the maximum when all circuits in the integrated device 200 are powered down, resistor 211 of the Vsense+ sense switch 204 and resistor 231 of Vsense− sense switch 224 provide quiescent voltage levels to Vsense+ die bump 205 and Vsense− die bump 225 respectively such that the reference voltage provided to the external power source would have a nominal voltage value. In some embodiments, in order to reduce the parasitic effects of resistors 211 and 231, the resistance value of resistor 211 may be much greater than the on-resistance of the PFET 212, and the resistance value of resistor 231 may be much greater than the on-resistance of the NFET 232. For example, in some embodiments, the resistance of resistor 211 to the on-resistance of the PFET 212 may have a ratio of at least 100:1. In alternative embodiments, the ratio may have other values.

In some embodiments, other circuits may be coupled to Vsense+ die bump 205 and Vsense− die bump 225. If the sense switches 204 and 224 are closed, the resulting reference voltage of the feedback signal is then the weighted average of the contributions from each of these circuits including circuit 201. To adjust the contribution to the reference voltage from circuit 201, the control signal 207 may be an analog voltage signal similar to the control signal 107 as described above to control the on-resistance of the PFET 112. To control the on-resistance of the NFET 232, the sense switch controller 206 may provide an inverse control signal to the gate terminal 233 of NFET 232. This inverse control signal is also an analog voltage signal and controls the on-resistance of NFET 232 similar to the way the on-resistance of the PFET 112 is controlled as discussed above. In some embodiments, the inverse control signal may have a voltage that has the opposite polarity of the voltage present on the control signal 207. In other embodiments, the sense switch controller 206 may drive the inverse control signal to a voltage independent of the voltage on control signal 207 to independently control the on-resistance of the NFET 232 separate from the PFET 112.

In other embodiments, the Vsense+ sense switch 204 may be implemented as shown in FIG. 1-3 and the Vsense− sense switch 224 may comprise of a resistor 231 coupled in parallel with a plurality of NFETs 282 arranged in parallel as shown in FIG. 2-3. In these embodiments, to adjust the contribution from circuit 201, the control signal 207 may be a digital signal bus with a plurality of control bits with each control bit controlling one of the PFETs in Vsense+ sense switch 204 and also to one of the NFETs 282 through a corresponding inverter. By using a plurality of PFETs 182 in Vsense+ sense switch 204 and a plurality of NFETs 282 in Vsense− sense switch 224, the sense switch controller 206 can adjust the equivalent resistance of the Vsense+ sense switch 204 and Vsense− sense switch 224 similar to the way the equivalent on-resistance of the Vsense sense switch 104 can be adjusted as discussed above. In some embodiments, the equivalent resistance of the Vsense+ sense switch 204 may be adjusted independently from the equivalent resistance of the Vsense− sense switch 224.

In alternative embodiments, if a circuit of the integrated circuit device has the ability to measure its own performance, for example, by measuring the difference in the frequency of a ring oscillator and a target reference frequency or by monitoring a lock status of an internal PLL, the circuit could request a higher supply current provided by the voltage supplied by an external power source by including a dependent voltage source between the pair of Vsense+ and Vsense− sense nodes. The voltage provided by the dependent voltage source would cause a proportional voltage drop across the Vsense+ die bump and Vsense− die bump. The external power source would then increase the voltage supplied proportionately. By this means, a circuit can adjust its own supply voltage to optimize a performance parameter.

In such alternative embodiments, the sense signal may be the voltage across the dependent voltage source, as shown in FIG. 3. The integrated circuit device 300 includes a circuit 301 that is able to measure its own dynamic performance, for example, by measuring the difference in the frequency of a ring oscillator 350 and a target frequency. The integrated circuit device 300 further comprises a dependent voltage source 360 coupled between Vsense+ sense node 203 and Vsense− sense node 223. The dependent voltage source 360 provides a reference voltage between Vsense+ sense node 203 and Vsense− sense node 223 to be used as the sense signal 302. This voltage across the dependent voltage source 360 represents the dynamic power requirement of the circuit 301. In some embodiments, the voltage across the dependent voltage source 360 depends on the difference in the frequency of the ring oscillator 350 and a target frequency representing the dynamic performance measurement of the circuit 301. In other embodiments, other means of dynamically measuring the performance of circuit 301 may be used, for example, by monitoring a lock status of an internal PLL.

By adding a dependent voltage source 360 between Vsense+ sense node 203 and Vsense− sense node 223, the circuit 301 may request a higher voltage supplied from an external power source. The circuit 301 may request a higher voltage supplied by decreasing the voltage 302 across the dependent voltage source 360 to lower the reference voltage between Vsense+ sense node 203 and Vsense− sense node 223. For example, if the circuit 301 is being operated at a higher target frequency and the present supply voltage is insufficient to meet the performance requirements at the higher target frequency, the difference in the frequency of the ring oscillator 350 and the higher target frequency increases. In response to this increase in the difference of the frequency of the ring oscillator 350 and the higher target frequency, the circuit 301 may decrease the voltage 302 across the dependent voltage source 360 to lower the reference voltage between Vsense+ sense node 203 and Vsense− sense node 223. This would then lower the reference voltage provided to the external power source. The external power source would then increase the voltage supplied to the integrated circuit device 300 proportionally and subsequently reduce the difference of the frequency of the ring oscillator 350 and the higher target frequency until both frequencies match. In other embodiments, when an internal PLL of the circuit 301 has not achieved a locked status, circuit 301 may cause the dependent voltage source 360 to decrease the voltage 302 to lower the reference voltage between Vsense+ sense node 203 and Vsense− sense node 223 until the PLL is locked. This feedback control mechanism allows the circuit 301 to adjust its own supply voltage to optimize a performance parameter. In alternative embodiments, this feedback control mechanism could also be implemented by digital communication between the integrated circuit device 300 and the external power source if both the integrated circuit device 300 and the external power source are capable of such communication with each other. The digital communication may be I2C, SPI, UART, or other digital communication methods known in the art.

Figures 1, 4:
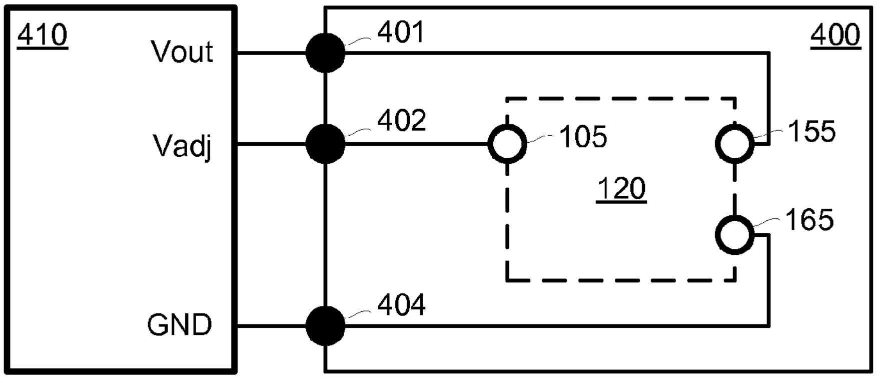
Figures 2, 4:
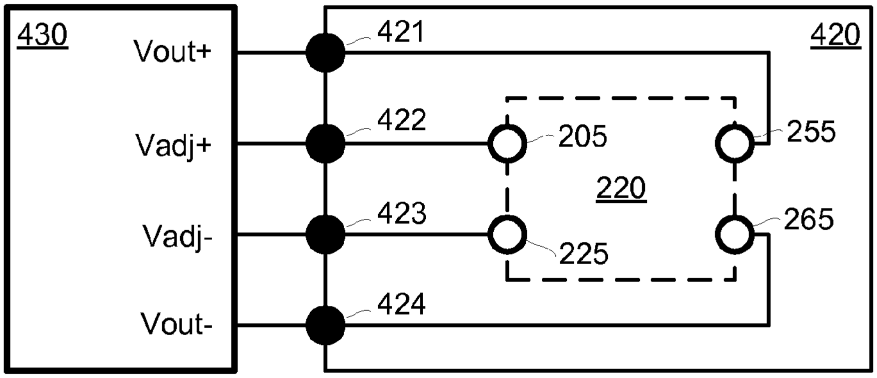
Figures 3, 4:
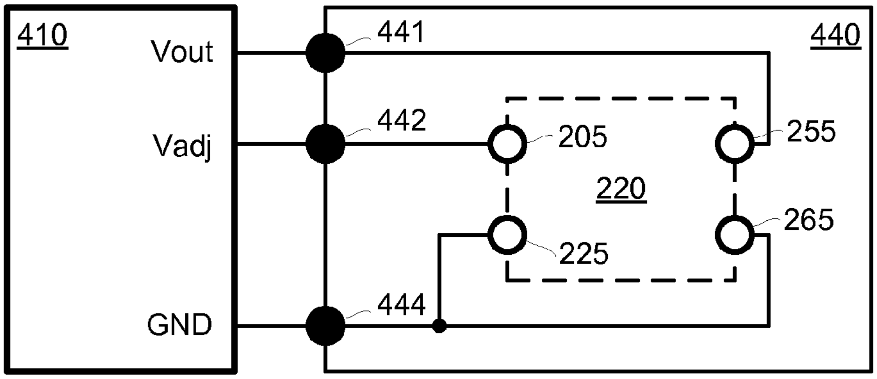

FIG. 4-1 shows the connectivity between an external power source 410 and an integrated circuit device 400 in accordance with some embodiments. The external power source 410 may be an external power supply or an external voltage regulator component such as a low-dropout regulator (LDO) on a printed circuit board (PCB). In other embodiments, other external power sources may be used. The integrated circuit device 400 includes a semiconductor die 120 with Vsense die bump 105, VCC die bump 155, and VSS die bump 165 bonded to Vsense package pad 401, VCC package pad 402, and VSS package pad 404 respectively. VCC die bump 155 is configured to receive a positive supply voltage from VCC package pad 401. The actual voltage received on VCC die bump 155 may be less than the voltage at VCC package pad 401 because of voltage drops along resistive paths between the package and the die 120. VSS die bump 165 is configured to receive a negative supply voltage or a common ground from VSS package pad 404. Vsense die bump 105 is configured to output a sense signal represent a dynamic power requirement of one or more circuits in the integrated circuit device 400 on Vsense package pad 402. This sense signal may be a voltage reference, as described above.

The external power source 410 has a Vout terminal coupled to VCC package pad 401 to output a positive supply voltage, and a GND terminal coupled to VSS package pad 404 for a negative supply voltage or common ground connection. The external power source 410 also has a Vadj terminal to receive a voltage reference from Vsense package pad 402. In response to the detected voltage reference on the Vadj terminal, external power source 410 adjusts the output supply voltage Vout such that the detected voltage reference on Vadj matches a nominal supply voltage to satisfy the dynamic power requirement of one or more circuits of the integrated circuit device 400.

FIG. 4-2 shows the connectivity between an external power source 430 and an integrated circuit device 420 in accordance with some other embodiments. The external power source 430 may be an external power supply or an external voltage regulator component such as a LDO on a PCB. In other embodiments, other external power sources may be used. The integrated circuit device 420 includes a semiconductor die 220 with Vsense+ die bumps 205, Vsense− die bump 225, VCC die bump 255, and VSS die bump 265 bonded to Vsense+ package pad 422, Vsense− package pad 423, VCC package pad 421, and VSS package pad 424, respectively. VCC die bump 255 is configured to receive a positive supply voltage from VCC package pad 421. VSS die bump 265 is configured to receive a negative supply voltage or a common ground from VSS package pad 424. Vsense+ die bump 205 is configured to output a positive voltage reference. Vsense− die bump 225 is configured to output a negative voltage reference. The voltage difference between the positive voltage reference on Vsense+ die bump 205 and the negative voltage reference on Vsense− die bump 225 may be a sense signal representing the dynamic power requirement of one or more circuits of the integrated circuit device 420.

The external power source 430 has a Vout+ terminal coupled to package pad 421 to output a positive supply voltage, and a Vout− terminal coupled to package pad 424 for a negative supply voltage or common ground connection. The external power source 430 also has a Vadj+ terminal to receive a positive supply voltage reference from package pad 422, and a Vadj− terminal to receive a negative supply voltage reference from package pad 423. In response to the detected voltage difference between Vadj+ and Vadj−, external power source 430 adjusts the output supply voltages Vout+ and Vout− such that the detected voltage difference between Vadj+ and Vadj− matches the nominal supply voltage to satisfy the dynamic power requirement of one or more circuits of the integrated circuit device 400.

FIG. 4-3 shows the connectivity between an external power source 410 and an integrated circuit device 440 in accordance with other further embodiments. In these embodiments, the integrated circuit device 440 includes a semiconductor die 220 with Vsense+ die bump 205, VCC die bump 255, and VSS die bump 265 bonded to Vsense package pad 442, VCC package pad 441, and VSS package pad 444 respectively. VCC die bump 255 is configured to receive a positive supply voltage from VCC package pad 441. VSS die bump 265 is configured to receive a negative supply voltage or a common ground from VSS package pad 444. Vsense+ die bump 205 is configured to output a positive voltage reference on Vsense package pad 442. The integrated circuit device 440 further includes a Vsense− die bump 225 coupled to VSS package pad 444. In other embodiments, Vsense− die bump 225 may be left unconnected or connected to a common ground outside the package.

The external power source 410 has a Vout+ terminal coupled to package pad 441 to output a positive supply voltage, and a Vout− terminal coupled to package pad 444 for a negative supply voltage or common ground connection. The external power source 410 also has a Vadj terminal to receive a voltage reference from package pad 442. In response to the detected voltage on Vadj, external power source 410 adjusts the output supply voltages Vout+ and Vout− such that the detected voltage difference on Vadj matches the nominal supply voltage to satisfy the dynamic power requirement of one or more circuits of the integrated circuit device 440.

Figure 5:
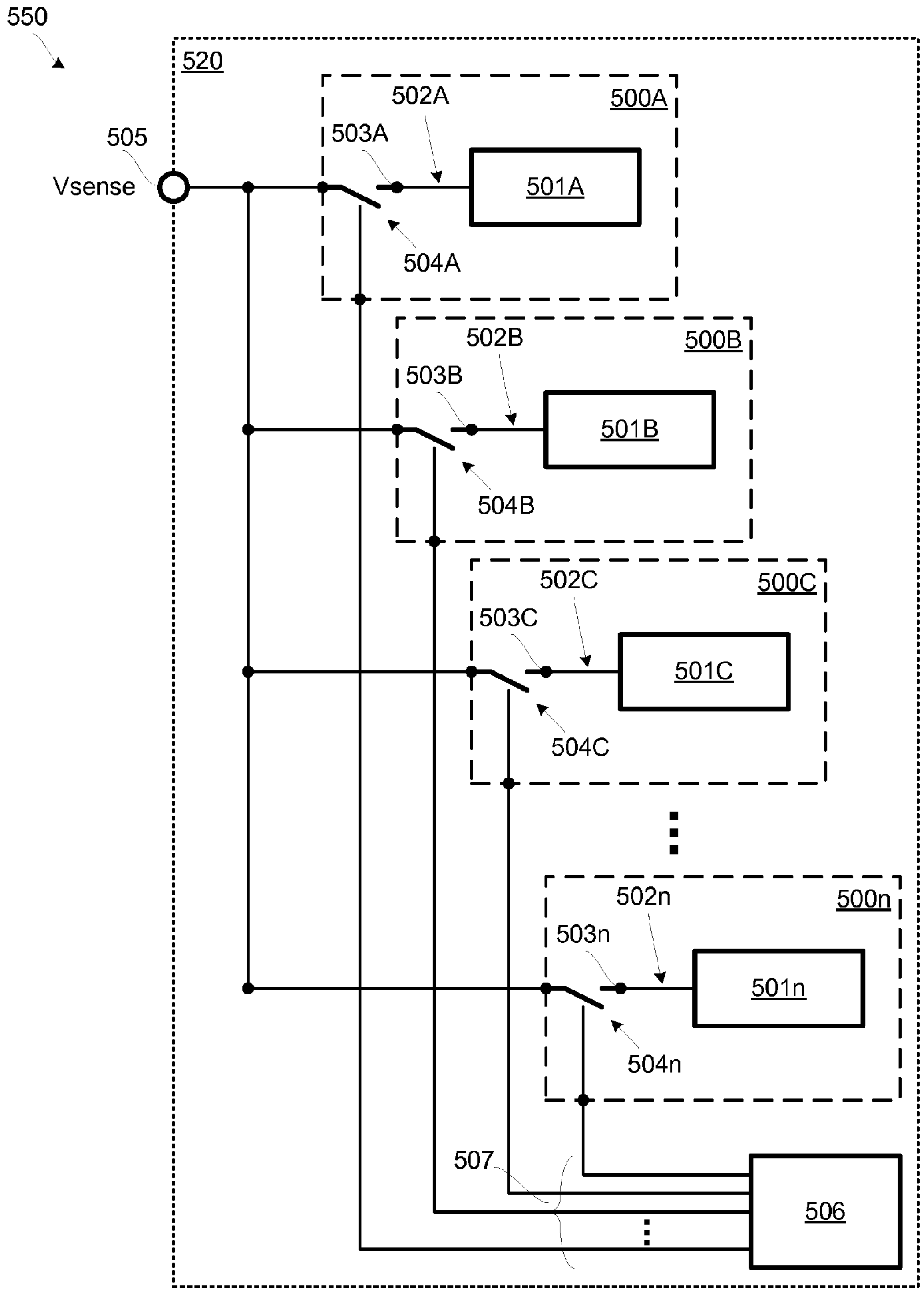
FIG. 5 illustrates an integrated circuit device with a plurality of sense switches in accordance with some embodiments.

FIG. 5 illustrates an integrated circuit device 550 in accordance with some further embodiments. The integrated circuit device 550 includes a semiconductor die 520 and a Vsense die bump 505. Additional die bumps may be present to connect other circuit I/Os to the device package (not shown). The integrated circuit device 550 further includes a plurality of circuits 500A-500*n* and a sense switch controller 506 implemented on the semiconductor die 520. Each of the plurality of circuits 500A-500*n* includes one of a plurality of sub-circuits 501A-501*n*, one of a plurality of sense nodes 503A-503*n*, and one of a plurality of sense switches 504A-504*n*. Each of the plurality of sub-circuits 501A-501*n* may have a different functionality, be implemented with a different number of transistors, have different switching activities and current draws, and be configured in a different mode depending on the state of the integrated circuit device 550. In addition, integrated circuit device 550 may also include other circuits that are not shown. Each of the sense switches 504A-504*n* is coupled between a corresponding one of the sense nodes 503A-503*n* and the Vsense die bump 505. The die bump 505 may be coupled to a Vsense output pad on the device package to provide a feedback signal to an external power source.

Each of the circuits 500A-500*n* is configured to provide a corresponding one of a plurality of sense signals 502A-502*n* that represents a dynamic power requirement of a corresponding one of the plurality of sub-circuits 501A-501*n* to a corresponding one of the plurality of sense nodes 503A-503*n*. In some embodiments, the sense signals 502A-502*n* may be the locally received supply voltage levels at the corresponding sub-circuits 501A-501*n*. The locally received supply voltage levels at the sub-circuits 501A-501*n* may be lower than the supply voltage that is supplied to the integrated circuit device 550 from an external power source because of voltage drops across resistive paths on a printed circuit board (PCB) and along resistive paths between the package and the sub-circuits 501A-501*n*. Furthermore, each of the locally received supply voltage levels at the sub-circuits 501A-501*n* may be different from one another because of the differences in the functionalities, number of transistors, switching activities, current draws, and the configurations of each of the sub-circuits 501A-501*n*.

The sense switch controller 506 is configured to provide a plurality of control signals 507 to the sense switches 504A-504*n*. When any of the sub-circuits 501A-501*n* are enabled or powered on, the sense switch controller 506 asserts the corresponding control signals 507 to close the sense switches 504A-504*n* to connect the sense signals 502A-502*n* corresponding to the enabled sub-circuits 501A-501*n* to the Vsense die bump 505. When any of the sub-circuits 501A-501*n* are disabled or powered down for power savings, the sense switch controller 506 may deassert the corresponding control signals 507 to open the sense switches 504A-504*n* to disconnect the sense signals 502A-502*n* corresponding to the disabled sub-circuits 501A-501*n* from the Vsense die bump 505. By coupling the sense signals 502A-502*n* through sense switches 504A-504*n*, the sub-circuits 501A-501*n* in the integrated circuit device 550 may share the same Vsense die bump 505 and hence the same sense output to provide a feedback signal to an external power source. The sense switches 504A-504*n* provides a way to disconnect any one of the sense signals 502A-502*n* from the Vsense die bump 505 to remove contributions to the feedback signal from sub-circuits 501A-501*n* that are disabled or powered down to more accurately reflect the overall power requirement of the integrated circuit device 550. In some embodiments, the sense switch controller 506 may be configured to assert only one of the control signals 507 to enable one of the sense switches 504A-504*n* corresponding to the one of the sub-circuits 501A-501*n* having the highest dynamic power requirement among the sub-circuits 501A-501*n*. The one of the sub-circuits 501A-501*n* having the highest dynamic power requirement maybe the sub-circuit having the highest current draw or the sub-circuit located furthest away from a supply voltage input pad in the power distribution network of the integrated circuit device 550.

In some embodiments, each of the sense switches 504A-504*n* may be implemented with a resistor 111 coupled in parallel with a PFET 112 as shown in FIG. 1-2. In other embodiments, any of the sense switches 504A-504*n* may be implemented as shown in FIG. 1-3 and as discussed above. In alternative embodiments, any of the sense switches 504A-504*n* may be implemented with other electrical switch circuits known in the art arranged in parallel with a resistive element. To prevent an external power source from driving the supply voltage provided to the integrated circuit device 550 to the maximum when all the sense switches 504A-504*n* are open, the resistors in each of the sense switches 504A-504*n* provides a quiescent voltage to the Vsense die bump 505 such that the feedback signal supplied to the external power source would have a nominal voltage.

Figure 6:
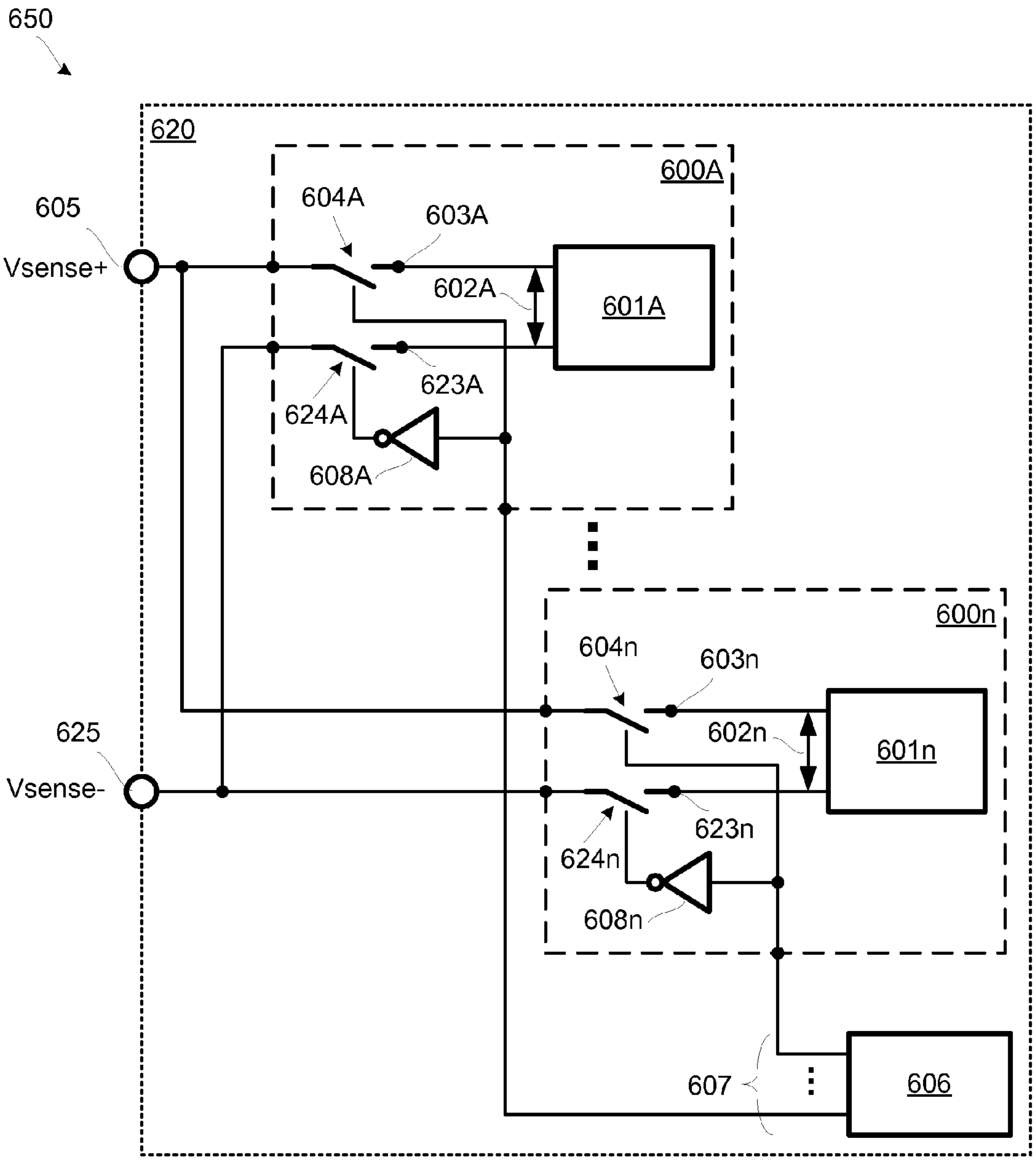
FIG. 6 illustrates an integrated circuit device with a plurality of sense switch pairs in accordance with some embodiments.

FIG. 6 illustrates an integrated circuit device 650 in accordance with yet other embodiments. The integrated circuit device 650 includes a semiconductor die 620, Vsense+ die bump 605, and Vsense− die bump 625. Other die bumps may be present to connect other circuit I/Os to the device package (not shown). The integrated circuit device 650 further includes a plurality of circuits 600A-600*n* and a sense switch controller 606 implemented on the semiconductor die 620. Each of the plurality of circuits 600A-600*n* includes one of a plurality of sub-circuits 601A-601*n*, one of a plurality of Vsense+ sense nodes 603A-603*n*, and one of a plurality of Vsense+ sense switches 604A-604*n* similar to the sub-circuits 501A-501*n* as discussed above of integrated circuit device 550 of FIG. 5.

The Vsense+ die bump 605 may be coupled to a Vsense+ output pad on the device package to provide a positive voltage reference to an external power source. Each of the plurality of circuits 600A-600*n* further includes a plurality of Vsense− sense switches 624A-624*n* coupled between a corresponding one of the Vsense− sense nodes 623A-623*n* and the Vsense− die bump 625. The Vsense− die bump 625 may be coupled to a Vsense− output pad on the device package to provide a negative voltage reference to an external power source.

Each of the circuits 600A-600*n* is configured to provide a corresponding one of a plurality of sense signals 602A-602*n* that represents a dynamic power requirement of a corresponding one of the plurality of sub-circuits 601A-601*n*. In some embodiments, each of the sense signals 602A-602*n* may be a voltage difference between the locally received positive supply voltage level and the locally received negative supply voltage level of one of the corresponding sub-circuits 601A-601*n*. The Vsense+ sense nodes 603A-603*n* may be coupled to the corresponding positive supply voltage of the sub-circuits 601A-601*n*, and Vsense− sense nodes 623A-623*n* may be coupled to the corresponding negative supply voltage of the sub-circuits 601A-601*n*. The locally received positive supply voltage levels and negative supply voltage levels may be different than the voltage that is supplied to the integrated circuit device 650 from an external power source because of voltage drops across resistive paths on a printed circuit board (PCB) and along resistive paths between the package and the sub-circuits 601A-601*n*. Furthermore, each of the locally received supply voltage levels at the sub-circuits 601A-601*n* may be different from one another because of the differences in the functionalities, number of transistors, switching activities, current draws, and the configurations of each of the sub-circuits 601A-601*n*.

The sense switch controller 606 is configured to provide a plurality of control signals 607 to the Vsense+ sense switches 604A-604*n* and to the Vsense− sense switches 624A-624*n*. When any of the sub-circuits 601A-601*n* are enabled or powered on, the sense switch controller 606 may assert the corresponding control signals 607 to close both the corresponding pair of Vsense+ sense switches 604A-604*n* and Vsense− sense switches 624A-624*n* to connect the sense signals 602A-602*n* corresponding to the enabled sub-circuits 601A-601*n* to the Vsense+ die bump 605 and the Vsense− die bump 625. When any of the sub-circuits 601A-601*n* are disabled or powered down for power savings, the sense switch controller 606 may deassert the corresponding control signals 607 to open the corresponding pair of Vsense+ sense switches 604A-604*n* and Vsense− sense switches 624A-624*n* to disconnect the sense signals 602A-602*n* corresponding to the disabled sub-circuits 601A-601*n* from the Vsense+ die bump 605 and the Vsense− die bump 625. By coupling the sense signals 602A-602*n* through the pairs of sense switches, the sub-circuits 601A-601*n* in the integrated circuit device 650 may share the same Vsense+ die bump 605 and Vsense− die bump 625 and hence the same sense outputs to provide a feedback signal to an external power source. The Vsense+ sense switches 604A-604*n* and Vsense− sense switches 624A-624*n* provide a way to disconnect any one of the sense signals 602A-602*n* from the Vsense+ die bump 605 and Vsense− die bump 625 to remove contributions to the feedback signal from sub-circuits 601A-601*n* that are disabled or powered down to more accurately reflect the overall power requirement of the integrated circuit device 650.

In some embodiments, the sense switch controller 606 may be configured to assert only one of the control signals 607 to close one of the pairs of sense switches corresponding to the one of the sub-circuits 601A-601*n* having the highest dynamic power requirement among the sub-circuits 601A-601*n*. Each of the sub-circuits has a corresponding voltage difference 602A-602*n* between a locally received positive supply voltage level and a locally received negative supply voltage level of the corresponding sub-circuit. In some embodiments, the sub-circuit having the lowest of the voltage differences 602A-602*n* may correspond to the one of the sub-circuits 601A-601*n* having the highest dynamic power requirement. In other embodiments, the one of the sub-circuits 601A-601*n* having the highest dynamic power requirement may be the sub-circuit having the highest current draw or the sub-circuit located furthest away from a supply voltage input pad in the power distribution network of the integrated circuit device 650.

In some embodiments, each of the Vsense+ sense switches 604A-604*n* may be implemented with a resistor 111 coupled in parallel with a PFET 112 as shown in FIG. 1-2. Each of the Vsense− sense switches 624A-624*n* may be implemented with a resistor 231 coupled in parallel with a NFET 232 as shown in FIG. 2-2. In other embodiments, any of the Vsense+ sense switches 604A-604*n* may be implemented as shown in FIG. 1-3 and any of the Vsense− sense switches 624A-624*n* may be implemented as shown in FIG. 2-3. In alternative embodiments, any of the Vsense-sense switches 624A-624*n* may be implemented with other electrical switch circuits known in the art arranged in parallel with a resistive element. To prevent an external power source from driving the supply voltage provided to the integrated circuit device 650 to the maximum when all the Vsense+ sense switches 604A-604*n* and all the Vsense− sense switches 624A-624*n* are open, the resistors in each of the sense switches provides a quiescent voltage to the Vsense+ die bump 605 and Vsense− die bump 625 such that the feedback signal supplied to the external power source would have a nominal voltage. For each of the circuits 600A-600*n*, the corresponding one of the control signals 607 may be coupled to the gate terminal 233 of the NFET 232 of Vsense− sense switches 624A-624*n* through one of the inverters 608A-608*n*.

In alternative embodiments, if a sub-circuit of the integrated circuit device has the ability to measure its own performance, for example, by measuring the difference in the frequency of a ring oscillator and a target frequency, the sub-circuit could request a higher supply current provided by the voltage supplied by an external power source by including a dependent voltage source between the pair of Vsense+ and Vsense− sense nodes. This dependent voltage source would cause a voltage drop across the Vsense+ die bump and Vsense− die bump to provide a feedback reference voltage to an external power source. The external power source would then increase voltage supplied based on this feedback reference voltage. By this means, the sub-circuit could adjust its own supply voltage to optimize a performance parameter.

Figure 7:
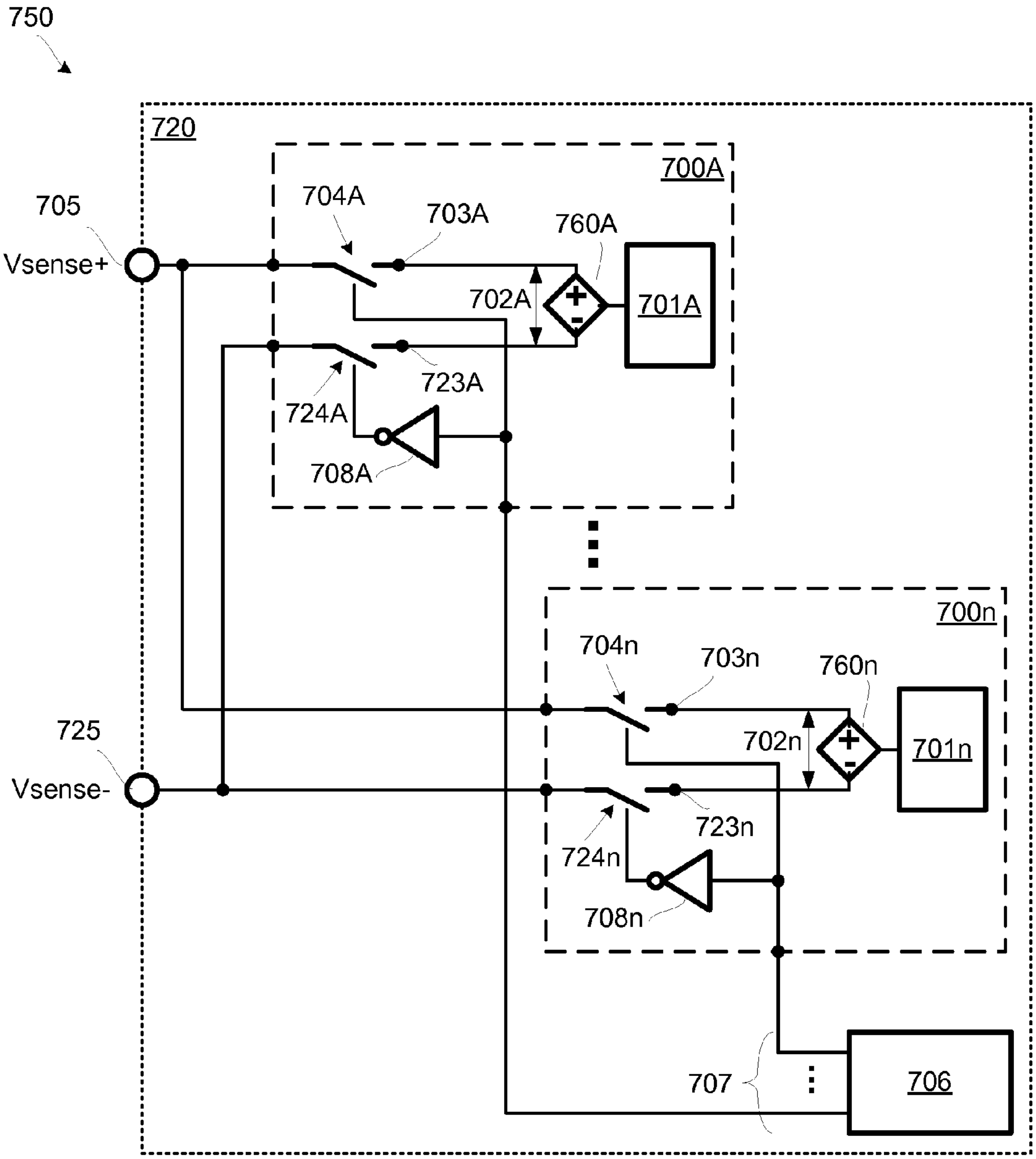
FIG. 7 illustrates an integrated circuit device with a plurality of sense switch pairs with sense signals represented by voltages across dependent voltage sources in accordance with some embodiments.

FIG. 7 illustrates an integrated circuit device 750 in accordance with such alternative embodiments with the plurality of sense signals represented by the voltages across the dependent voltage sources. The integrated circuit device 750 includes a plurality of circuits 700A-700*n*. Each of the circuits 700A-700*n* comprises one of the dependent voltage sources 760A-760*n* coupled between the corresponding pair of Vsense+ sense nodes 703A-703*n* and Vsense− sense nodes 723A-723*n*. Each of the dependent voltage sources 760A-760*n* provides a voltage to be used as the sense signals 702A-702*n* between Vsense+ sense nodes 703A-703*n* and Vsense− sense nodes 723A-723*n*. The voltages 702A-702*n* across the dependent voltage sources 760A-760*n* represent the dynamic power requirements of the sub-circuits 701A-701*n*. In some embodiments, each of the voltages 702A-702*n* across the dependent voltage sources 760A-760*n* is dependent on the difference in the frequency of a ring oscillator and a target frequency of one of the corresponding sub-circuits 701A-701*n*. In each of the sub-circuits 701A-701*n*, the difference in the frequency of a ring oscillator and a target frequency represents a measurement of the dynamic performance of the sub-circuit. In other embodiments, each of the voltages 702A-702*n* across the dependent voltage sources 760A-760*n* may be dependent on the lock status of an internal PLL in the corresponding sub-circuits 701A-701*n*. In alternative embodiments, other means of dynamically measuring the performance of the sub-circuits 701A-701*n* may be used, and the measurement of the dynamic performance of any one of the sub-circuits 701A-701*n* may be implemented differently from any other one of the sub-circuits 701A-701*n*.

By including a dependent voltage source, each of the circuits 700A-700*n* may request a higher voltage supplied from an external power source. The circuits 700A-700*n* may request a higher supply voltage by decreasing the voltages 702A-702*n* across the corresponding dependent voltage sources 760A-760*n* to lower the voltage difference across the corresponding pair of sense nodes. For example, if the sub-circuit 701A is being operated at a higher target frequency and requires an increase in the supply voltage, the difference in the frequency of a ring oscillator and the higher target frequency in the sub-circuit 701A increases. In response to this increase in the difference of frequencies, sub-circuit 701A may cause the dependent voltage source 760A to decrease the voltage 702A to lower the reference voltage between Vsense+ sense node 703A and Vsense− sense node 723A. This lowering of the reference voltage from circuit 700A would cause a proportional voltage drop across Vsense+ sense node 703A and Vsense− sense node 723A, which in turn lowers the contribution of the sensed reference voltage difference by circuit 700A provided to the external power source through the Vsense+ die bump 705 and Vsense− die bump 725. The external power source would then increase voltage supplied to the integrated circuit device 750 proportionally. In other embodiments, when an internal PLL has not achieved a locked status, sub-circuit 701A may cause the dependent voltage source 760A to decrease the voltage 702A to lower the reference voltage between Vsense+ sense node 703A and Vsense− sense node 723A until the PLL is locked. This feedback control mechanism allows any of the sub-circuits 701A-701*n* to adjust its own locally received supply voltage levels to optimize a performance parameter of the sub-circuit. In alternative embodiments, this feedback control mechanism could also be implemented by digital communication between the integrated circuit device 750 and the external power source if both the integrated circuit device 750 and the external power source are capable of such communication with each other. The digital communication may be I2C, SPI, UART, or other digital communication methods known in the art. In some embodiments, any of the circuits 700A-700*n* may have its corresponding one of the sense signals 702A-702*n* implemented as either a voltage difference between a locally received positive supply voltage level and a locally received negative supply voltage level, or a controlled current as discussed above.

In other embodiments, the sense switch controller 706 may be configured to assert only one of the control signals 707 to close one of the pairs of sense switches corresponding to the one of the sub-circuits 701A-701*n* having the highest dynamic power requirement among the sub-circuits 701A-701*n*. The one of the sub-circuits 701A-701*n* having the highest dynamic power requirement maybe the sub-circuit having the highest current draw, the sub-circuit located furthest away from a supply voltage input pad in the power distribution network of the integrated circuit device 750, or the sub-circuit having the highest dynamic performance.

Figure 8:
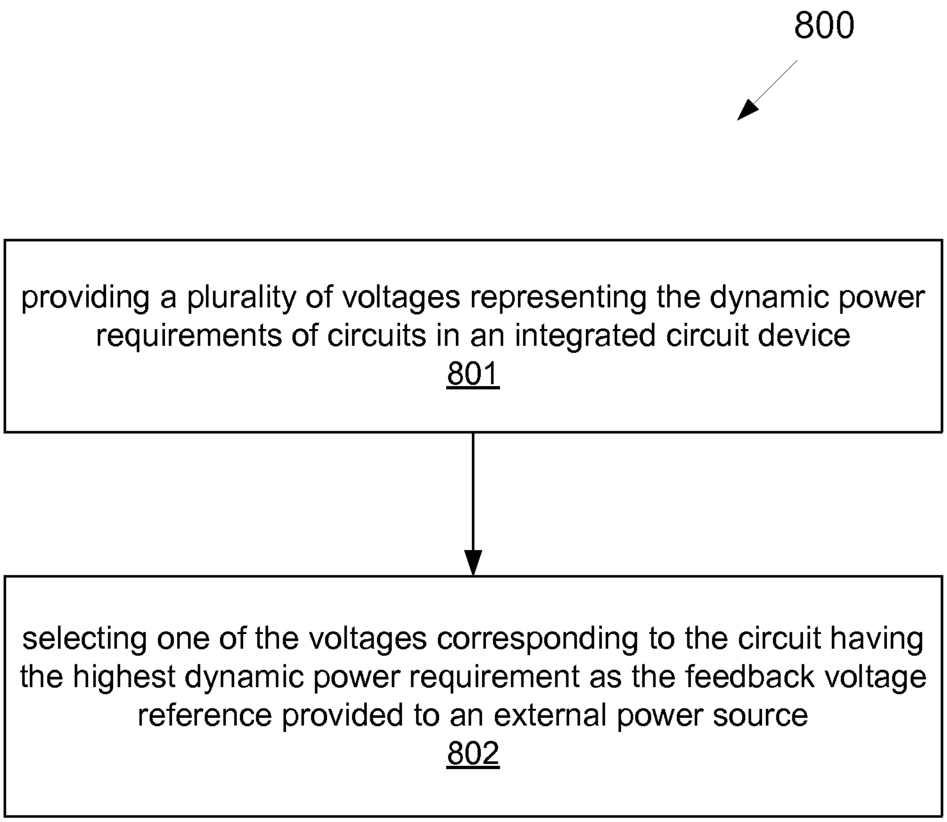
FIG. 8 illustrates a method for providing a feedback voltage reference to an external power source of an integrated circuit device in accordance with some embodiments.

FIG. 8 illustrates a method 800 for providing a feedback voltage reference to an external power source of an integrated circuit device having a plurality of circuits. Step 801 provides a plurality of voltages with each one of the voltages representing a dynamic power requirement of one of the circuits of the integrated device. Step 802 selects one of the plurality of voltages corresponding to the circuit having the highest dynamic power requirement as the feedback reference voltage. The external power source may be an external power supply or an external voltage regulator component such as a LDO on PCB.

Many applications require more than one circuit in an integrated circuit device to share the same supply voltage. As a result, the supply voltages locally received at the different circuit blocks within the integrated circuit device may have different voltage levels because of the differences in the functionalities, number of transistors, switching activities, current draws, and the configurations of each of circuits. By providing a feedback voltage reference that corresponds to the circuit having the highest dynamic power requirement, method 800 ensures that an external power source would provide a supply voltage that is adequate for all the circuits in the integrated circuit device. In response to this worst-case feedback reference voltage, an external power source can increase the supply voltage provided to the integrated circuit device such that the supply voltage yields sufficient current to satisfy the dynamic power requirement of the circuit having the highest dynamic power requirement. Because all other circuits would require a lesser voltage requirement than the one with the highest dynamic power requirement, if the supply voltage level is adequate for that circuit, then the supply voltage level would be adequate for all of the other circuits in the device.

In some embodiments, any one of the plurality of voltages may represent the locally received supply voltage level at the corresponding one of the circuits. The locally received supply voltage level may be different than the voltage that is provided by an external power source because of voltage drops across resistive paths on a printed circuit board (PCB) and along resistive paths between the package and the circuits. In other embodiments, any one of the plurality of voltages may be a voltage across a dependent voltage source that represents a dynamic performance measurement of the corresponding one of the circuits. The dynamic performance of a circuit may be, for example, measured by the difference in the frequency of a ring oscillator and a target frequency in the circuit. In these exemplary embodiments, the voltage across the dependent voltage source may depend on the difference in the frequency of a ring oscillator and a target frequency of the corresponding one of the circuits. In alternative embodiments, the voltage across the dependent voltage source may depend on the lock status of a PLL in the corresponding one of the circuits.

As illustrated in the above embodiments, providing a feedback voltage reference to an external power source as described is advantageous because it allows for any number of separate circuits in an integrated circuit device, with each circuit having varying power requirements, to participate in regulating and optimizing an externally provided supply voltage without dramatically increasing the number of output pads on the package. Furthermore, by moving the sense points to the individual circuits on the die may reduce variations in the locally received voltage levels at the individual circuits to enable higher performance circuit designs. Adding the FET switches with resistive shunts in series with each sense signal enables multiple circuits to resistively average out the feedback reference voltage such that all circuits are included in the feedback scheme. In addition, the FET switches allow circuits that are powered down to be disconnected from the resistive averaging to more accurate reflect the true dynamic power requirement of the integrated circuit device. The same feedback scheme may also be used to selectively pick the circuit with the highest dynamic power requirement or the highest performance measurement to dictate the feedback reference voltage.

Although particular embodiments have been shown and described, it will be understood that they are not intended to limit the claimed invention, and it will be obvious to those skilled in the art that various changes and modifications may be made without departing from the spirit and scope of the present inventions. The specification and drawings are, accordingly, to be regarded in an illustrative rather than restrictive sense. The claimed invention is intended to cover alternatives, modifications, and equivalents.

What is claimed is:

1. An integrated circuit device, comprising: a circuit configured to provide a sense signal representing a dynamic power requirement of the circuit to a first sense node;

a first sense switch coupled between the first sense node and a first die bump; and a sense switch controller configured to provide a control signal to the first sense switch, wherein: the first sense switch comprises a first resistor coupled in parallel to a PFET; and the sense switch controller is configured to provide the control signal to a gate terminal of the PFET.

2. The integrated circuit device of claim 1, wherein: the control signal is an analog voltage signal; and the sense switch controller is configured to control an on-resistance of the PFET with the analog voltage signal.

3. The integrated circuit device of claim 1, further comprising a second sense switch coupled between a second sense node and a second die bump, wherein: the second sense switch comprises a second resistor coupled in parallel to a NFET; and the sense switch controller is configured to provide the control signal to a gate terminal of the NFET through an inverter.

4. The integrated circuit device of claim 3, wherein: the first sense node is configured to sense a positive supply potential of the circuit; the second sense node is configured to sense a negative supply potential of the circuit; and the sense signal is a voltage difference between a locally received positive supply voltage level and a locally received negative supply voltage level of the circuit.

5. The integrated circuit device of claim 3, wherein the sense signal is a voltage reference provided by a dependent voltage source between the first sense node and the second sense node.

6. The integrated circuit device of claim 5, wherein the voltage reference is dependent on either a difference between a frequency of a ring oscillator and a target frequency of the circuit, or a lock status of a PLL of the circuit.

7. The integrated circuit device of claim 1, further comprising a second sense switch coupled between a second sense node and a second die bump, wherein:

the second sense switch comprises a second resistor coupled in parallel to a NFET;

the sense switch controller is configured to provide an inverse control signal to a gate terminal of the NFET, the inverse control signal being an analog voltage signal; and the sense switch controller is configured to control an on-resistance of the NFET with the analog voltage signal.

8. The integrated circuit device of claim 1, further comprising a second sense switch coupled between a second sense node and a second die bump, wherein:

the second sense switch comprises a second resistor coupled in parallel to a plurality of NFETs arranged in parallel;

the control signal is a signal bus comprising a plurality of control bits; and the sense switch controller is configured to, for each of the plurality of NFETs, provide one of the plurality of control bits of the signal bus to a gate terminal of the corresponding NFET through a corresponding inverter.

9. The integrated circuit device of claim 1, wherein the first sense switch comprises a first resistor coupled in parallel to a plurality of PFETs arranged in parallel, the control signal is a signal bus comprising a plurality of control bits, and the sense switch controller is configured to, for each of the plurality of PFETs, provide one of the plurality of control bits of the signal bus to a gate terminal of the corresponding PFET.

10. An integrated circuit device, comprising:

a first die bump;

a plurality of circuits coupled to the first die bump, wherein each one of the circuits comprises: a first sense switch coupled between a first sense node and the first die bump, and a sub-circuit configured to provide a sense signal representing a dynamic power requirement of the sub-circuit to the first sense node; and a sense switch controller configured to provide a plurality of control signals to the respective first sense switches, wherein: each one of the first sense switches comprises a first resistor coupled in parallel to a PFET; and the sense switch controller is configured to provide a corresponding one of the control signals to a corresponding gate terminal of the corresponding PFET.

11. The integrated circuit device of claim 10, further comprising:

a second die bump;

wherein each one of the circuits further comprises a second sense switch coupled between a second sense node and the second die bump, the second sense switch comprising a second resistor coupled in parallel to a NFET; and wherein the sense switch controller is configured to provide a corresponding one of the control signals to a corresponding gate terminal of the corresponding NFET through a corresponding inverter.

12. The integrated circuit device of claim 11, wherein:

each one of the circuits further comprises one of the first sense nodes sensing a positive supply potential of the corresponding circuit, and one of the second sense nodes sensing a negative supply potential of the corresponding circuit; and each one of the sense signals is a voltage difference between a locally received positive supply voltage level of one of the sub-circuits and a locally received negative supply voltage level of the corresponding sub-circuit.

13. The integrated circuit device of claim 12, wherein the sense switch controller is configured to assert one of the control signals to close one of the first sense switches and one of the second sense switches corresponding to one of the plurality of sub-circuits having the lowest voltage difference between the locally received positive supply voltage level of one of the sub-circuits and the locally received negative supply voltage level of the corresponding sub-circuit.

14. The integrated circuit device of claim 10, wherein the sense switch controller is configured to assert one of the control signals to close one of the first sense switches corresponding to one of the plurality of sub-circuits having the highest dynamic power requirement.

* * * * *